United States Patent
Ito

(10) Patent No.: US 11,830,201 B2
(45) Date of Patent: Nov. 28, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hidenori Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 498 days.

(21) Appl. No.: 17/032,600

(22) Filed: Sep. 25, 2020

(65) Prior Publication Data

US 2021/0104050 A1 Apr. 8, 2021

(30) Foreign Application Priority Data

Oct. 2, 2019 (JP) .................. 2019-182004

(51) Int. Cl.
*G06T 7/194* (2017.01)
*G06T 7/215* (2017.01)

(52) U.S. Cl.
CPC .............. *G06T 7/194* (2017.01); *G06T 7/215* (2017.01); *G06T 2207/20081* (2013.01); *G06T 2207/20104* (2013.01); *G06T 2207/30196* (2013.01); *G06T 2207/30224* (2013.01); *G06T 2207/30228* (2013.01)

(58) Field of Classification Search
CPC ..................... G06T 7/194; G06T 7/215; G06T 2207/20081; G06T 2207/20104; G06T 2207/30196; G06T 2207/30224; G06T 2207/30228
See application file for complete search history.

(56) References Cited

U.S. PATENT DOCUMENTS

| | | | | |
|---|---|---|---|---|
| 5,978,100 A * | 11/1999 | Kinjo | ................... | H04N 1/4072 358/453 |
| 6,282,317 B1 * | 8/2001 | Luo | ........................ | G06T 11/60 382/203 |

(Continued)

FOREIGN PATENT DOCUMENTS

| EP | 3425592 A1 * | 1/2019 | ......... G06K 9/00778 |
|---|---|---|---|
| JP | 2007316882 A | 12/2007 | |

(Continued)

OTHER PUBLICATIONS

Fu et al., "Object-based multiple foreground video co-segmentation" (pp. 1-8) (Year: 2014).*

(Continued)

*Primary Examiner* — Manav Seth
(74) *Attorney, Agent, or Firm* — Carter, DeLuca & Farrell LLP

(57) ABSTRACT

In order to extract a foreground area more appropriately, an image processing apparatus for extracting a foreground area from an inputted image includes an image input unit that sets a first area and a second area different from the first area in the inputted image, a first extraction unit that extracts a foreground area from the first area, and a second extraction unit that extracts a foreground area from the second area by using an extraction method different from an extraction method used by the first extraction unit.

14 Claims, 17 Drawing Sheets

(56) References Cited

U.S. PATENT DOCUMENTS

| | | | | |
|---|---|---|---|---|
| 6,335,985 B1* | 1/2002 | Sambonsugi | G06V 10/255 | 382/190 |
| 6,529,630 B1* | 3/2003 | Kinjo | G06T 7/11 | 382/118 |
| 6,556,711 B2* | 4/2003 | Koga | G06T 3/40 | 358/464 |
| 6,807,285 B1* | 10/2004 | Iwamura | H04N 1/32352 | 726/32 |
| 7,092,569 B1* | 8/2006 | Kinjo | G06V 40/161 | 382/282 |
| 7,167,581 B2* | 1/2007 | Kawano | G06T 7/11 | 382/128 |
| 7,313,254 B2* | 12/2007 | Lee | G06T 7/12 | 382/103 |
| 7,379,591 B2* | 5/2008 | Kinjo | G06V 40/161 | 382/302 |
| 7,830,550 B2* | 11/2010 | Jang | H04N 1/40012 | 358/1.9 |
| 7,929,729 B2* | 4/2011 | Huang | G06V 10/28 | 382/103 |
| 8,306,263 B2* | 11/2012 | Nagaoka | G06V 20/58 | 382/103 |
| 8,411,954 B2* | 4/2013 | Takagi | G06T 7/42 | 382/302 |
| 8,564,594 B2* | 10/2013 | Lee | G06F 16/5838 | 345/589 |
| 8,774,504 B1* | 7/2014 | Sundareswara | G06V 10/56 | 382/165 |
| 9,299,005 B2* | 3/2016 | Kim | G06T 7/12 | |
| 9,415,723 B2* | 8/2016 | Sumitomo | B60R 1/00 | |
| 9,454,813 B2* | 9/2016 | Westerhoff | G06V 10/50 | |
| 9,636,871 B2* | 5/2017 | Butler | B29C 64/386 | |
| 9,875,405 B2* | 1/2018 | Yu | G06T 7/215 | |
| 10,552,980 B2* | 2/2020 | Ito | H04N 7/18 | |
| 10,726,620 B2* | 7/2020 | Nishiyama | G06T 7/251 | |
| 11,025,878 B2* | 6/2021 | Ota | H04N 13/172 | |
| 11,379,999 B2* | 7/2022 | Kawai | G06V 10/765 | |
| 2006/0204036 A1* | 9/2006 | Huang | H04N 5/145 | 348/169 |
| 2009/0279781 A1* | 11/2009 | Kitabatake | G06V 30/413 | 382/176 |
| 2011/0141251 A1* | 6/2011 | Marks | G06T 7/11 | 348/222.1 |
| 2013/0336581 A1* | 12/2013 | Datta | G06V 20/54 | 382/165 |
| 2019/0005653 A1* | 1/2019 | Choi | G06T 7/194 | |
| 2020/0334820 A1* | 10/2020 | Radich | G06T 15/20 | |
| 2021/0366129 A1* | 11/2021 | Yamauchi | G06T 7/194 | |

FOREIGN PATENT DOCUMENTS

| | | |
|---|---|---|
| JP | 2012-048484 A | 3/2012 |
| JP | 2019067129 A | 4/2019 |

OTHER PUBLICATIONS

Noh, Hyeonwoo et al., "Learning deconvolution network for semantic segmentation" Proceedings of the IEEE International Conference on Computer Vision (ICCV) (May 2015) pp. 1520-1528.

Notice of Reasons for Refusal issued by the Japanese Patent Office dated Aug. 15, 2023 in corresponding JP Patent Application No. 2019-182004, with English translation.

* cited by examiner

IMAGE PROCESSING APPARATUS 100B

IMAGE PROCESSING APPARATUS 100D

IMAGE PROCESSING APPARATUS 100B

IMAGE PROCESSING APPARATUS 100D

IMAGE PROCESSING APPARATUS 100B

IMAGE PROCESSING APPARATUS 100D

IMAGE PROCESSING APPARATUS 100B

IMAGE PROCESSING APPARATUS 100D

IMAGE PROCESSING APPARATUS 100B

IMAGE PROCESSING APPARATUS 100D

IMAGE PROCESSING APPARATUS 100B

IMAGE PROCESSING APPARATUS 100D

IMAGE PROCESSING APPARATUS 1100B

IMAGE PROCESSING APPARATUS 1100D

IMAGE PROCESSING APPARATUS, IMAGE PROCESSING METHOD, AND STORAGE MEDIUM

BACKGROUND

Field

The present disclosure relates to a technique for extracting a foreground area from an image.

Description of the Related Art

Foreground extraction methods for extracting a foreground area from an image have heretofore been used for various purposes and various methods have been proposed to date. For example, a technique disclosed in Japanese Patent Laid-Open No. 2012-48484 first extracts an area containing a movement as a foreground candidate area by using a background differencing technique, and then detects a foreground area from the foreground candidate area by using feature quantities. Meanwhile, a technique disclosed in Hyeonwoo Noh, Seunghoon Hong, and Bohyung Han, "Learning deconvolution network for semantic segmentation", Proceedings of the IEEE International Conference on Computer Vision (ICCV), 2015, pp. 1520-1528 (hereinafter referred to as Non-patent Document 1), for example, can extract multiple semantically different foreground areas in accordance with a foreground extraction method based on a result of machine learning while using a convolution network and a deconvolution network in combination. Here, the semantically different areas represent areas involving different types of objects such as a person and a ball.

However, the following problems will arise in the case of using the background differencing technique and the foreground extraction method using a result of machine learning. Specifically, the background differencing technique detects changes in pixel value of respective pixels between inputted images and a background image is generated by using pixels with changes falling within a predetermined threshold. Then, an inputted image targeted for extraction of a foreground area is compared with the background image and pixels each having a difference in pixel value equal to or above a predetermined threshold are extracted as a foreground area. According to this method, a motionless object that hardly moves is captured in the background image, and it is not possible to extract an area where the motionless object is present as the foreground area. In a soccer game, for example, an area where moving objects such as a player and a ball are present can be extracted as the foreground area but an area where motionless objects such as a corner flag and a goal inclusive of a goal net are present cannot be extracted as the foreground area. On the other hand, the foreground extraction method using a result of machine learning causes an increase in processing load.

SUMMARY

The present disclosure has been made in view of the aforementioned problems. An object of the present disclosure is to extract a foreground area more appropriately.

An image processing apparatus according to an aspect of the present disclosure includes a setting unit that sets a first area and a second area different from the first area in the inputted image, a first extraction unit that extracts a foreground area from the first area, and a second extraction unit that extracts a foreground area from the second area by using an extraction method different from an extraction method used by the first extraction unit.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present invention is not limited to the configurations shown schematically.

While an example of applying the present disclosure to a soccer game will be illustrated and explained in the following description of embodiments, it is to be noted that the present disclosure is not limited only to this example. The present disclosure is applicable to any images that contain a moving object such as a player (a person) and a ball together with a motionless object such as a soccer goal and a corner flag. Here, the moving object may include at least one of a player (a person) and a ball, while the motionless object may include at least one of a soccer goal and a corner flag used in a soccer match. In the meantime, the motionless object in these embodiments only may be a stationary object that does not change its position in a case where an imaging apparatus installed at a fixed position with a fixed angle continuously shoots images thereof. For example, the motionless object may be defined as an object installed at a predetermined position. Moreover, at least such motionless objects may be installed on a field where persons being moving objects play the game. In a case where a shooting scene takes place in an indoor studio or the like, furniture and properties can be treated as the motionless objects.

In the following embodiments, terms denoted by the same reference signs suffixed with different alphabets indicate different instances having the same function. For example, a camera 202A and a camera 202b represent different instances that have the same function.

First Embodiment

A first embodiment will describe an example in which an area in an inputted image to apply a foreground extraction method based on a result of machine learning is limited to an area containing a motionless object and a background differencing technique is applied to the remaining area. In this way, it is possible to extract a motionless object as a foreground area together with a moving object therein while suppressing an increase in processing load attributed to calculation processing that uses the foreground extraction method based on a result of machine learning.

Figure 1:
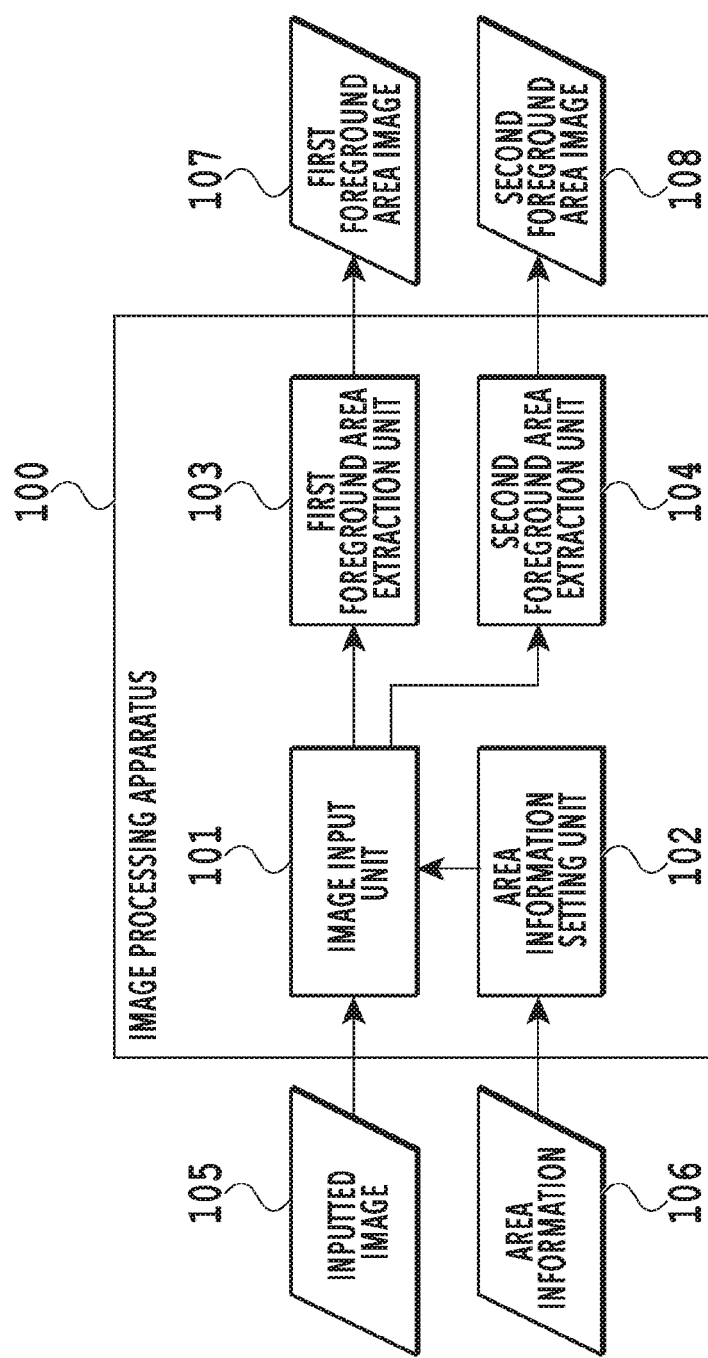
FIG. 1 is a functional configuration diagram of an image processing apparatus according to a first embodiment.

FIG. 1 shows a functional configuration diagram of an image processing apparatus 100 according to a first embodiment. The image processing apparatus 100 outputs a first foreground area image 107 and a second foreground area image 108 by using an inputted image 105 being a target for extracting a foreground area and using area information 106 indicating a foreground area extraction unit to be applied to each partial area in the inputted image 105 collectively as an input.

An image input unit 101 receives the inputted image 105 and inputs the inputted image 105 to the image processing apparatus 100. The inputted image 105 may be inputted from an imaging apparatus such as a camera through an SDI cable or may be inputted in the form of image data through an interface such as a USB interface and a PCIe interface.

An area information setting unit 102 receives and stores the area information 106. The area information 106 is information designated by a user in advance for each imaging apparatus installed at a fixed position with a fixed angle, and contains information as to which foreground area extraction unit is to be applied to which area in the inputted image 105. For example, in the inputted image, the area information 106 can use a binary value of "0" or "1" to indicate which one of two foreground area extraction units is to be applied to each area. In other words, the area information 106 can designate the position of the area to apply each foreground area extraction unit in terms of an image shot with each imaging apparatus at the fixed position with the fixed angle. More details will be discussed later with reference to an operation example of the image processing apparatus 100. The area information 106 is outputted to the image input unit 101. The image input unit 101 allocates each of partial areas in the inputted image 105 to any of a first foreground area extraction unit 103 and a second foreground area extraction unit 104 based on the area information 106.

Regarding the partial areas allocated by the image input unit 101, the first foreground area extraction unit 103 and the second foreground area extraction unit 104 generate foreground area images each indicating an area where a foreground is present while using foreground extraction methods that are different from each other. The first foreground area extraction unit 103 and the second foreground area extraction unit 104 output the first foreground area image 107 and the second foreground area image 108 which are the foreground area images generated by the respective extraction units. Each foreground area image may be formed into a silhouette image in which a foreground is expressed with a white silhouette while a background is expressed with a black color, for example.

Figure 2:
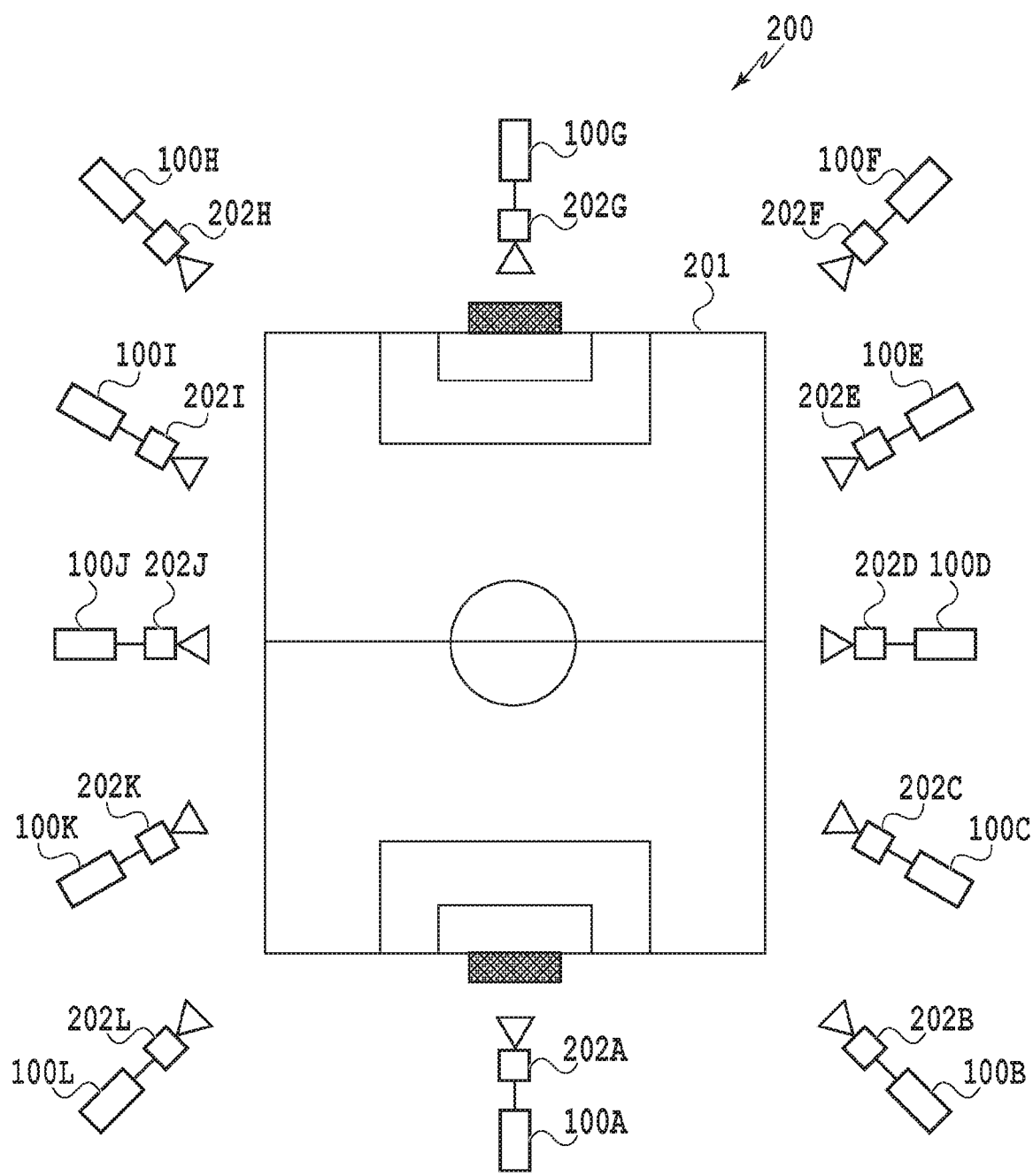
FIG. 2 is a diagram showing an application example of the image processing apparatus according to the first embodiment.

FIG. 2 shows an application example 200 of the image processing apparatus 100 according to the first embodiment. Cameras 202A to 202L deployed around a foreground extraction target field 201, which is a soccer field, and image processing apparatuses 100A to 100L connected to the respective cameras are present in the application example 200. The foreground extraction target field 201 is shot with each camera 202 and a shooting result is inputted to the corresponding image processing apparatus 100 as the inputted image 105. Each image processing apparatus 100 generates the foreground area image that represents an extraction result of the foreground area from the inputted image 105. The generated foreground area image can be used for generating a three-dimensional model from silhouette information and texture information thereof and generating a virtual viewpoint image from an arbitrary virtual viewpoint in a three-dimensional space, for example.

Next, an operation example of the image processing apparatus 100 according to the first embodiment will be described with reference to FIGS. 3 to 9B. In the description of this operation example, images shot by the camera 202B and the camera 202D in FIG. 2 will be used as the inputted images. Respective inputted images in a state without any players or balls in the field become an inputted image 401 of FIG. 4A and an inputted image 402 of FIG. 4B. The inputted image 401 and the inputted image 402 include a field 403, a goal A 404, and a goal B 405.

Meanwhile, in this embodiment, the first foreground area extraction unit 103 extracts a foreground area by using the method according to the machine learning as disclosed in Non-patent Document 1 while the second foreground area extraction unit 104 extracts a foreground area by using the method according to the background differencing technique. Non-patent Document 1 discloses that it is possible to output the foreground area information which allocates mutually different areas to an inputted image containing a person and a non-person. This embodiment uses a method obtained by learning to enable detection of a player and a ball which are moving objects as foreground areas in addition to a soccer goal and a corner flag which are motionless objects.

Now, the learning by the first foreground area extraction unit 103 will be described. The first foreground area extraction unit 103 is constructed by a convolutional neural network that includes an input layer, an intermediate layer, and an output layer, for example. Moreover, there is obtained a difference between output data outputted from the output layer of the neural network in response to input data inputted to the input layer thereof and teaching data. The difference between the output data from the neural network and the teaching data may be calculated by using a loss function. Here, the input data is an image that contains a motionless object, a moving object, and other data such as a background. Meanwhile, the teaching data is an image that contains only the motionless object and the moving object that represent a correct answer.

Regarding the above-mentioned difference, a coupling weight coefficient between nodes in the neural network and other parameters are updated in such a way as to reduce the difference. For example, the coupling weight coefficient and the like are updated by using a backpropagation method. The backpropagation method is a method of adjusting the coupling weight coefficient between nodes in each neural network and other parameters so as to reduce the above-mentioned difference.

Here, specific examples of such a learning algorithm include the nearest neighbor algorithm, the Naive Bayes algorithm, the decision tree algorithm, the support vector machine algorithm, and so forth. Still another example is deep learning that generates the coupling weight coefficient on its own. Among these algorithms, an available one can be applied to this embodiment as appropriate.

Figure 3:
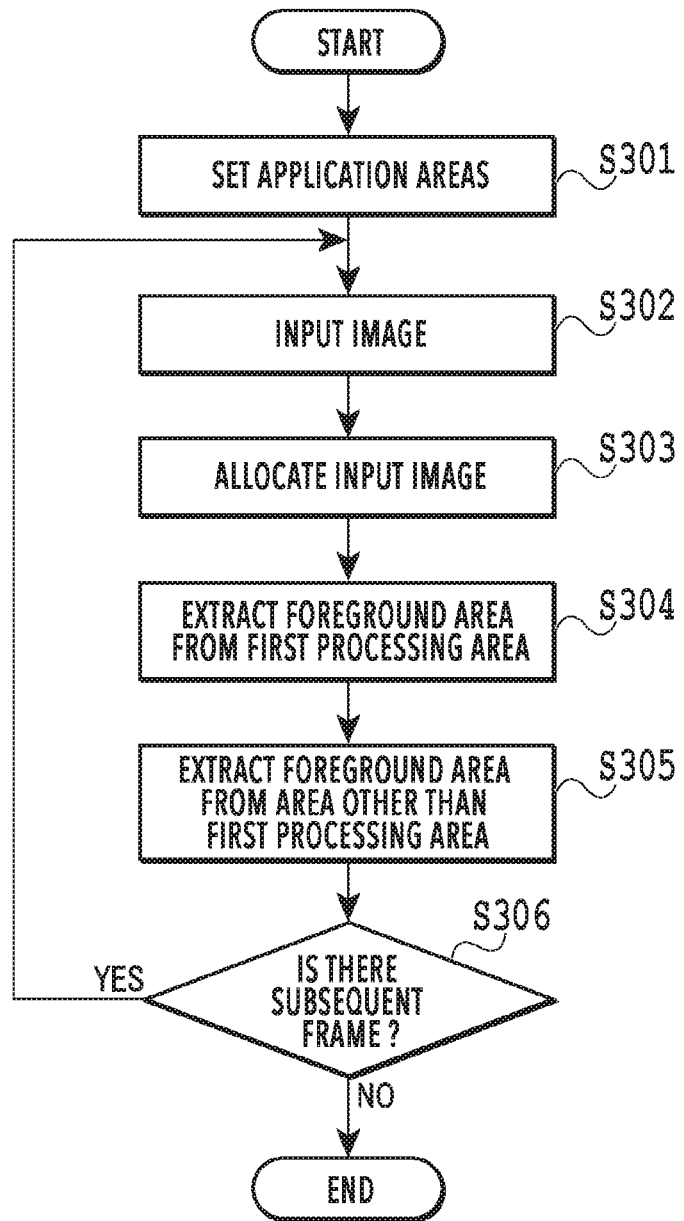
FIG. 3 is a flowchart of foreground extraction processing according to the first embodiment.

FIG. 3 shows a flowchart of foreground extraction processing according to the first embodiment. In accordance with the operation shown in this flowchart, the image processing apparatus 100 receives the inputted images 105 of multiple frames, executes the foreground extraction processing, and generates foreground area images. Note that the series of processing shown in the flowchart is carried out by causing a CPU in the image processing apparatus 100 to load a control program stored in a ROM or an HDD on a RAM and to execute the program. Alternatively, part of all of functions in the steps on the flowchart may be realized by hardware such as an ASIC and an electronic circuit. In the meantime, a symbol "S" in the description of the flowchart represents a step in the flowchart. The same applies to other flowcharts.

Figure 5A:
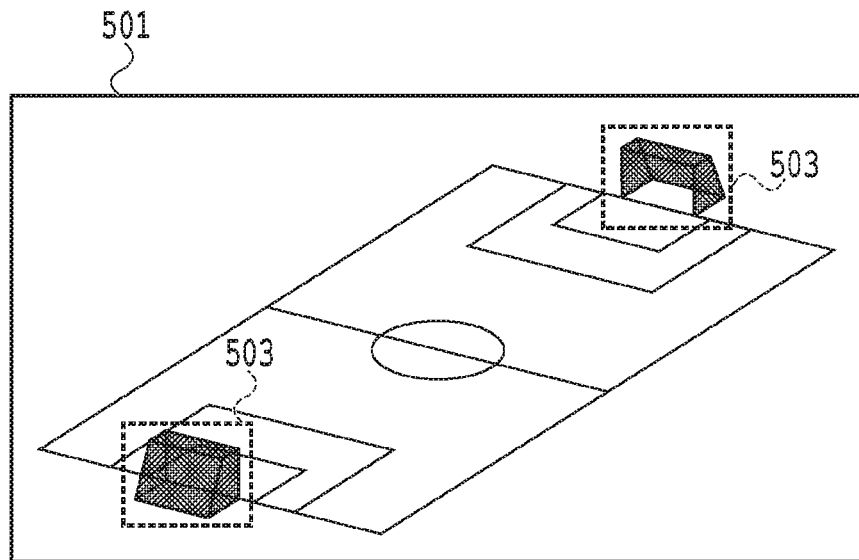
FIG. 5A is a diagram showing an example of area information according to the first embodiment.
Figure 5B:
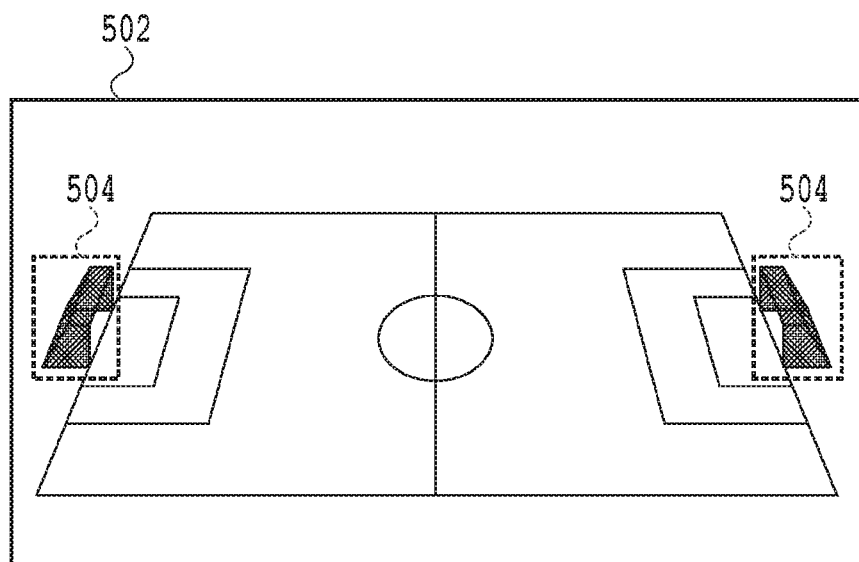
FIG. 5B is a diagram showing another example of area information according to the first embodiment.

In S301, the area information setting unit 102 receives the area information 106 and performs setting of application areas for the respective foreground area extraction units. An image processing apparatus 100B corresponding to the camera 202B in this operation example receives area information 501 shown in FIG. 5A as the area information 106. Meanwhile, an image processing apparatus 100D corresponding to the camera 202D in this operation example receives area information 502 shown in FIG. 5B as the area information 106. The area information 501 includes a first processing area 503 which applies the foreground extraction method based on a result of machine learning while the area information 502 includes a first processing area 504 which applies the foreground extraction method based on a result of machine learning likewise. In the area information 501 and 502, the first processing areas 503 and 504 and the remaining area can be expressed by using binary values of "0" and "1". The first processing areas 503 and 504 can be designated by the value "1" and defined as the areas to apply the first foreground area extraction unit 103. Meanwhile, the areas other than the first processing areas 503 and 504 can be designated by the value "0" and defined as the areas to apply the second foreground area extraction unit 104. Thus, it is possible to use the respective foreground area extraction units differently by designating positions of the areas to apply the respective foreground area extraction units while the area information 106. As described above, the first foreground area extraction unit 103 of this embodiment has learned to be capable of extracting the soccer goal and the corner flag which are the motionless objects. By setting the partial area applying the foreground extraction method based on a result of machine learning so as to include the soccer goal as in the case of the first processing areas 503 and 504, the soccer goal included in each of these areas can be extracted as the foreground. In the meantime, the first foreground area extraction unit 103 of this embodiment can also extract the player and the ball which are the moving objects. For this reason, the player and the ball can be extracted as the foreground area even from an inputted image in the state where the player and the ball go into the first processing areas 503 and 504. In this embodiment, it is possible to suppress an increase in calculation processing load by limiting the first processing areas 503 and 504 to areas, which are the areas to apply the foreground extraction method based on a result of machine learning, to the areas including the motionless objects as shown in FIGS. 5A and 5B. Here, since the positions of the motionless objects do not change, each area to be designated as the first processing area may be fixed in every frame in the case where the imaging apparatus installed at a fixed position with a fixed angle continuously shoots the images.

Figure 6A:
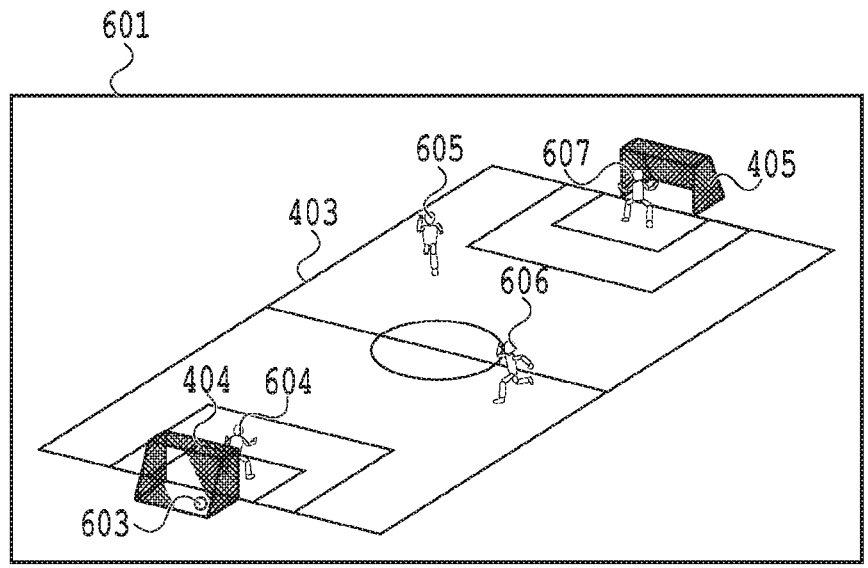
FIG. 6A is a diagram showing an example of an inputted image according to the first embodiment in which moving objects and motionless objects are present.
Figure 6B:
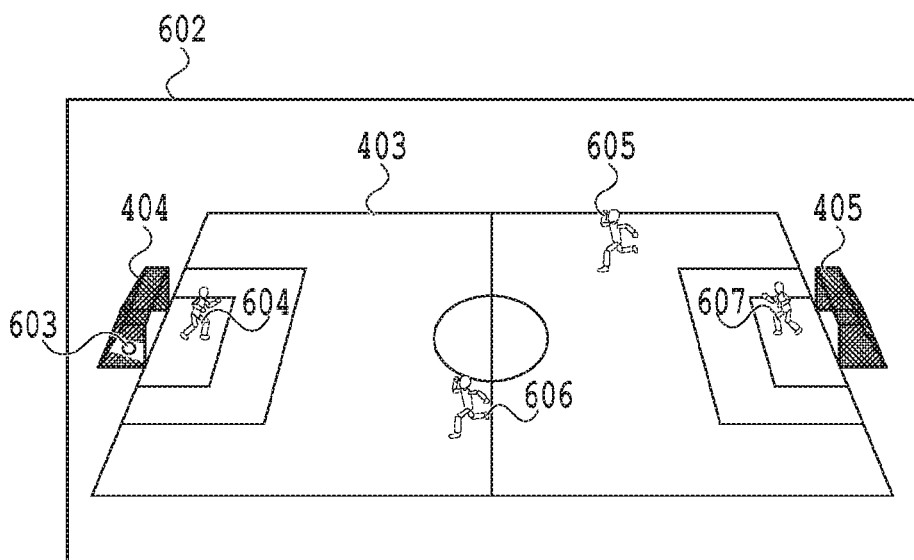
FIG. 6B is a diagram showing another example of an inputted image according to the first embodiment in which moving objects and motionless objects are present.

In S302, the image input unit 101 inputs the inputted image 105 which is a target for detection of the foreground area. FIG. 6A shows an inputted image 601 to the image processing apparatus 100B in a certain frame where players and a ball are present in the field. FIG. 6B shows an inputted image 602 to the image processing apparatus 100D in the certain frame where the players and the ball are present in the field. A ball 603, a player A 604, a player B 605, a player C 606, and a player D 607 are present in each of the inputted image 601 and the inputted image 602.

Figure 7A:
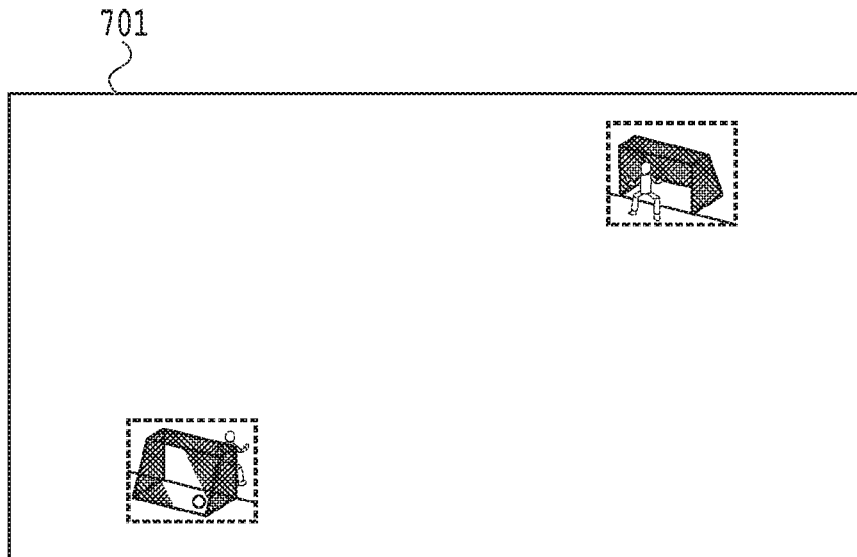
FIG. 7A is a diagram showing an example of an image processed by a first foreground area extraction unit according to the first embodiment.
Figure 7B:
FIG. 7B is a diagram showing another example of an image processed by a first foreground area extraction unit according to the first embodiment.
Figure 8A:
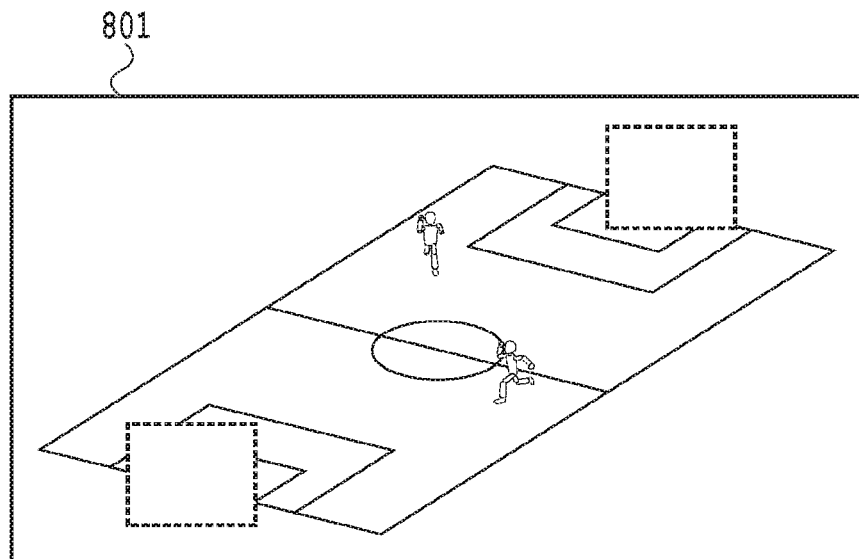
FIG. 8A is a diagram showing an example of an image processed by a second foreground area extraction unit according to the first embodiment.
Figure 8B:
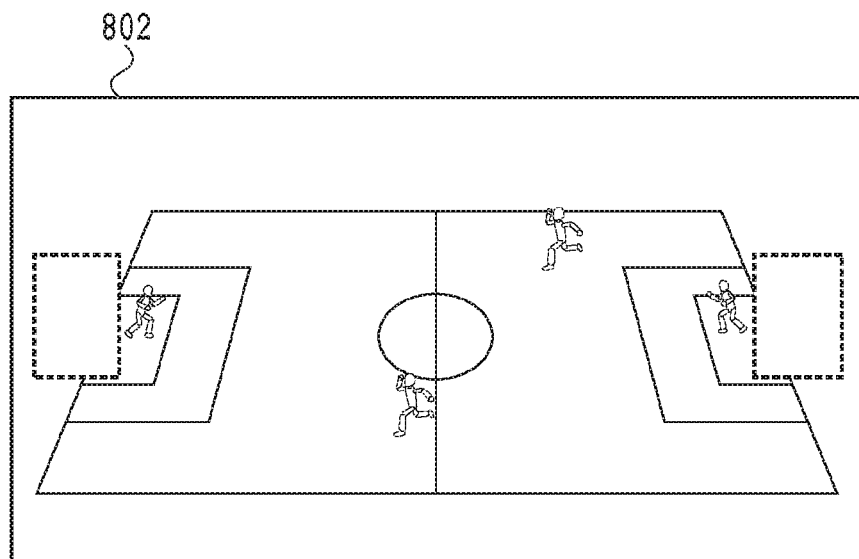
FIG. 8B is a diagram showing another example of an image processed by a second foreground area extraction unit according to the first embodiment.
Figure 9A:
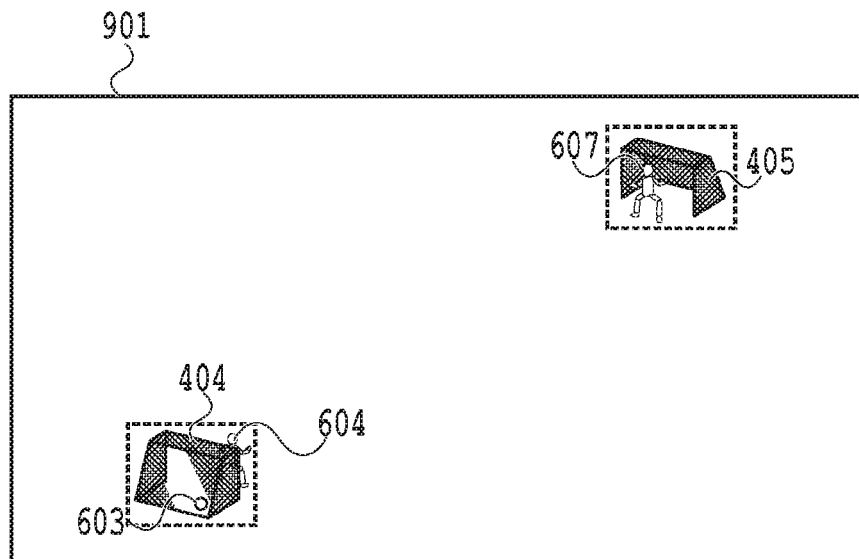
FIG. 9A is a diagram showing an example of an extraction result of a first foreground area according to the first embodiment.
Figure 9B:
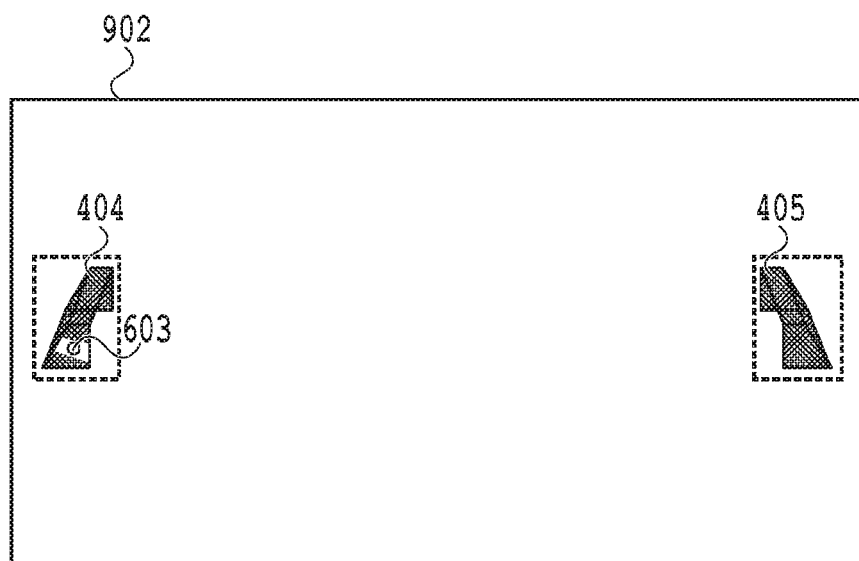
FIG. 9B is a diagram showing another example of an extraction result of a first foreground area according to the first embodiment.

In S303, the image input unit 101 performs allocation of the inputted image 105 to the first foreground area extraction unit 103 and the second foreground area extraction unit 104 based on the set area information 106. Of the inputted image 105, images in the first processing areas 503 and 504 are outputted to the first foreground area extraction unit 103 while images in the remaining area are outputted to the second foreground area extraction unit 104. FIG. 7A shows an image 701 to be processed by the first foreground area extraction unit 103 in the image processing apparatus 100B. FIG. 7B shows an image 702 to be processed by the first foreground area extraction unit 103 in the image processing apparatus 100D. Meanwhile, FIG. 8A shows an image 801 to be processed by the second foreground area extraction unit 104 in the image processing apparatus 100B. FIG. 8B shows an image 802 to be processed by the second foreground area extraction unit 104 in the image processing apparatus 100D.

In S304, the first foreground area extraction units 103 of the image processing apparatuses 100B and 100D extract the foreground areas from the images 701 and 702, respectively. The first foreground area extraction units 103 perform the foreground extraction processing based on a result of machine learning on the images 701 and 702, and generate a first foreground extraction result 901 shown in FIG. 9A and a first foreground extraction result 902 shown in FIG. 9B as the first foreground area images 107, respectively. The first foreground extraction result 901 includes the ball 603, the player A 604, and the player D 607 which are the moving objects in addition to the goal A 404 and the goal B 405 which are the motionless objects. The first foreground extraction result 902 includes the ball 603 which is the moving object in addition to the goal A 404 and the goal B 405 which are the motionless objects.

Figure 10A:
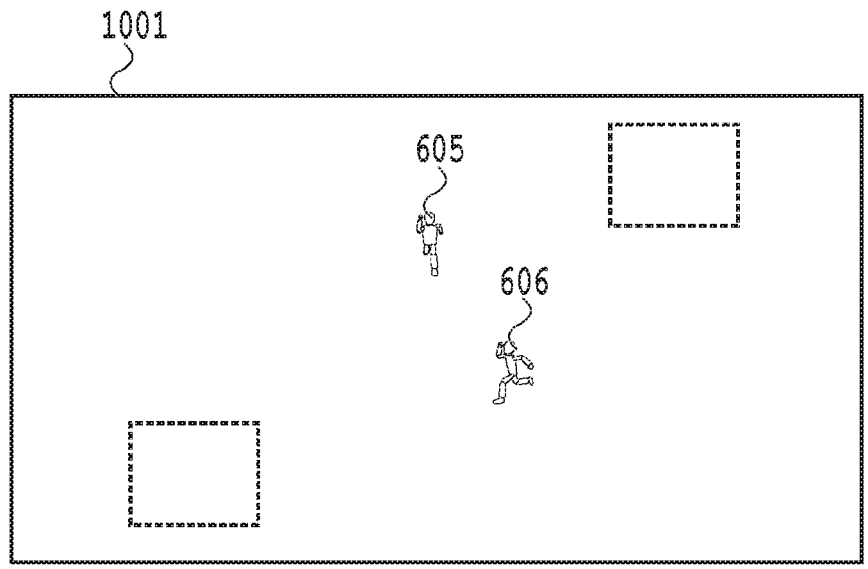
FIG. 10A is a diagram showing an example of an extraction result of a second foreground area according to the first embodiment.
Figure 10B:
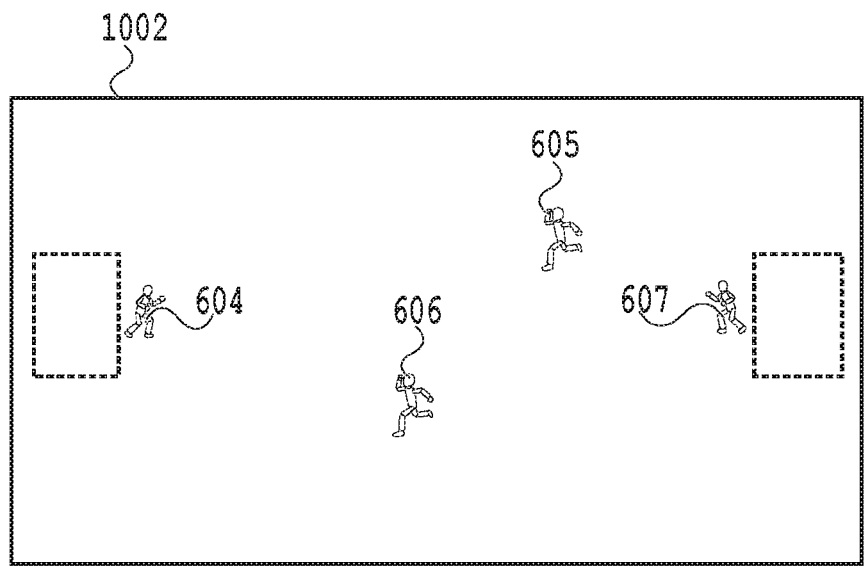
FIG. 10B is a diagram showing another example of an extraction result of a second foreground area according to the first embodiment.

In S305, the second foreground area extraction units 104 of the image processing apparatuses 100B and 100D extract the foreground areas from the images 801 and 802, respectively. The images 801 and 802 represent the images other than the first areas 503 and 504. The second foreground area extraction units 104 perform the foreground extraction processing according to the background differencing technique on the images 801 and 802, and generate a second foreground extraction result 1001 shown in FIG. 10A and a second foreground extraction result 1002 shown in FIG. 10B as the second foreground area images, respectively. The second foreground extraction result 1001 includes the player B 605 and the player C 606 which are the moving objects. The second foreground extraction result 1002 includes the player A 604, the player B 605, the player C 606, and the player D 607 which are the moving objects. Although the area processed by the second foreground area extraction units 104 does not include the ball in this embodiment, the ball being the moving object can also be extracted as the foreground area in accordance with the background differencing technique in the case where the ball is included in the area processed by the second foreground area extraction units 104.

The order of the foreground extraction processing of S304 and S305 is not limited only to the aforementioned order. Specifically, S305 may be carried out first or S304 and S305 may be carried out in parallel.

In S306, the image input unit 101 determines whether or not there is an inputted image of a subsequent frame. In the case where there is the inputted image of the subsequent frame, the processing goes back to S302 and is continued. The processing is terminated if there is no subsequent frame.

Here, it is also possible to combine the first foreground area image 107 and the second foreground area image 108 into a single foreground area image.

As described above, the image processing apparatus 100 according to the first embodiment can carry out the foreground extraction processing on the inputted image including the extraction-target motionless object as the foreground while reducing the area to apply the foreground area extraction method that requires a higher processing load and thus suppressing an increase in processing load. In other words, this image processing apparatus 100 can extract the motionless object as the foreground area from the inputted image and suppress the increase in processing load in the foreground extraction processing at the same time.

Second Embodiment

Figure 4A:
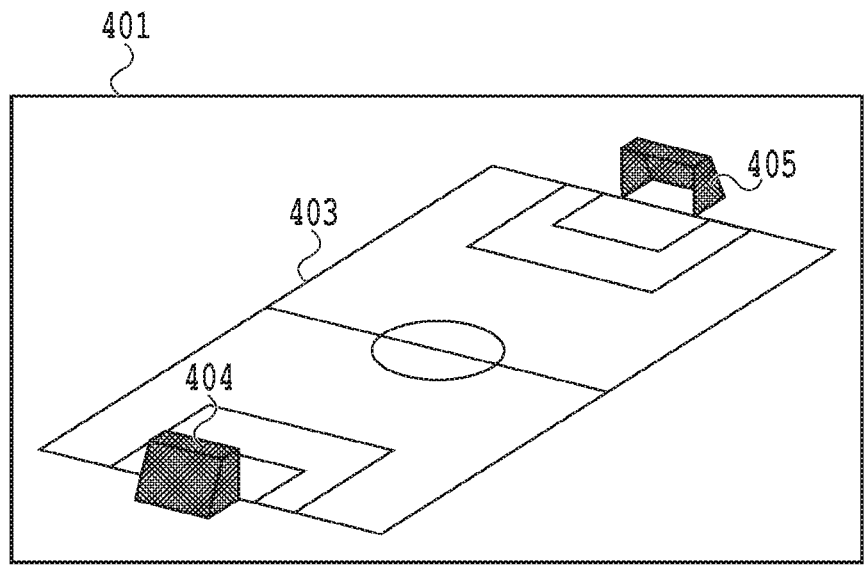
FIG. 4A is a diagram showing an example of an inputted image according to the first embodiment in which only motionless objects are present.
Figure 4B:
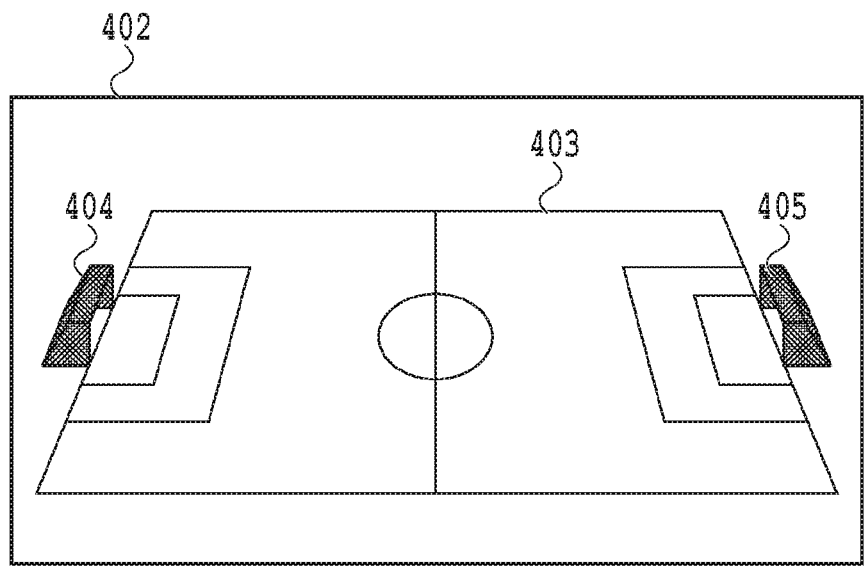
FIG. 4B is a diagram showing another example of an inputted image according to the first embodiment in which only motionless objects are present.

A second embodiment will describe a method of excluding spectator stands and spectators, which are not targets for extraction of the foreground area, from a processing target of foreground extraction in a case where the spectator stands and the spectators are included in the inputted images shown in FIGS. 4A and 4B.

Figure 11:
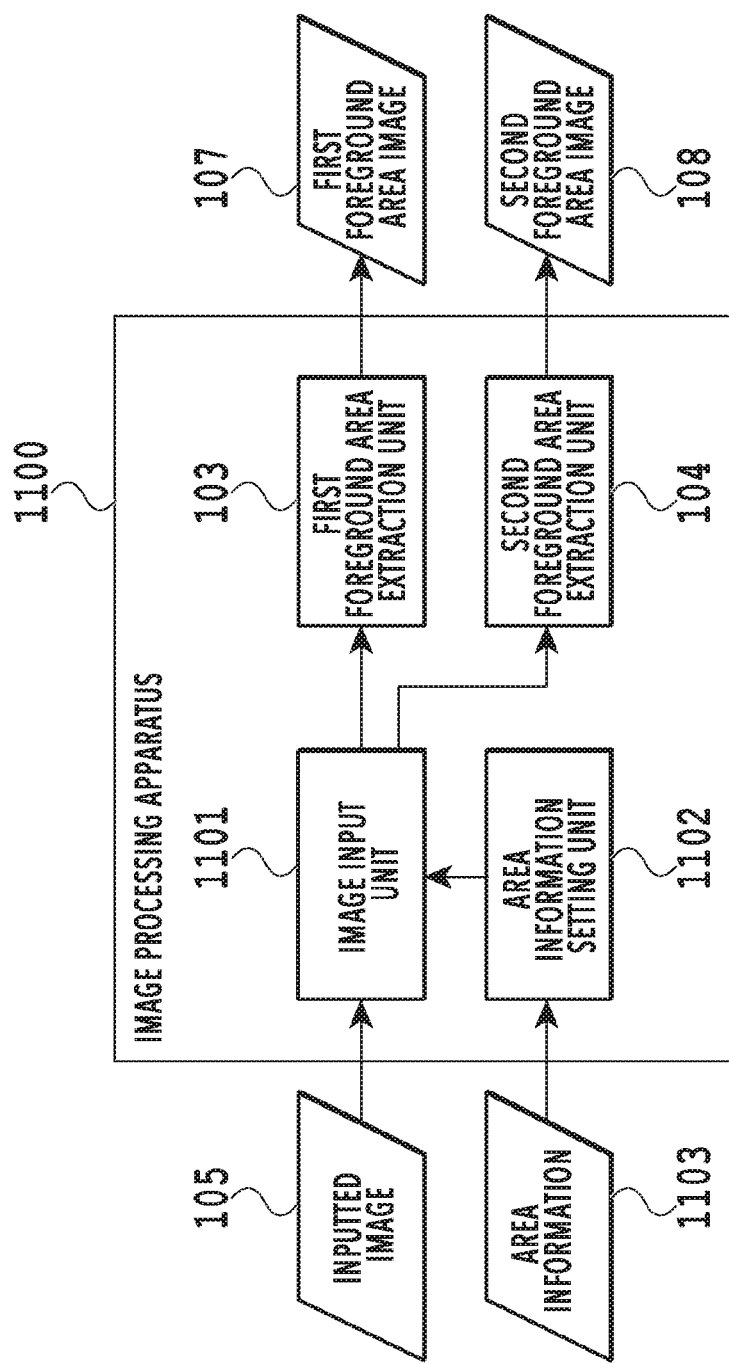
FIG. 11 is a configuration diagram of an image processing apparatus according to a second embodiment.

FIG. 11 shows a functional configuration diagram of an image processing apparatus 1100 according to the second embodiment. Blocks in FIG. 11 which are denoted by the same reference signs as those in FIG. 1 of the first embodiment have the same operations as those of the first embodiment and explanations thereof will be omitted.

An image input unit 1101 receives the inputted image 105 being the target for extraction of the foreground area, and inputs the inputted image 105 to the image processing apparatus 1100.

An area information setting unit 1102 receives area information 1103. As with the area information 106 of the first embodiment, the area information 1103 contains information as to which foreground area extraction unit is to be applied to which area in the inputted image 105. The area information 1103 also contains information on the area that applies none of the foreground area extraction units, or in other words, the area not subjected to the foreground extraction processing. More details will be described later in conjunction with an operation example of the image processing apparatus 1100. The area information 1103 is outputted to the image input unit 1101. The image input unit 1101 outputs a partial area in the inputted image 105 to the first foreground area extraction unit 103 and outputs another partial area therein to the second foreground area extraction unit 104 based on the area information 1103. The image input unit 1101 does not output areas not included in the aforementioned partial areas.

Figure 12:
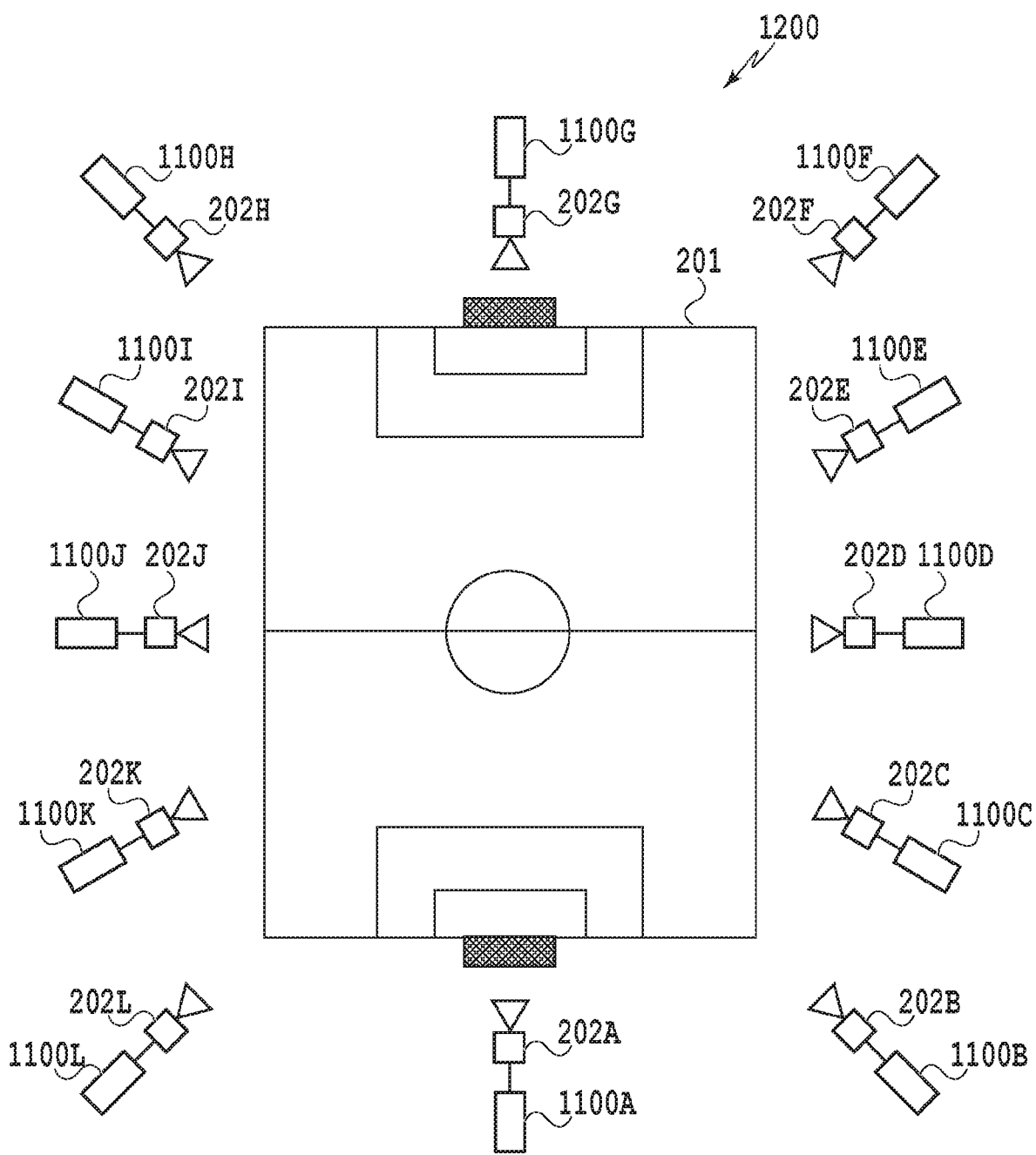
FIG. 12 is a diagram showing an application example of the image processing apparatus according to the second embodiment.

FIG. 12 shows an application example 1200 of the image processing apparatus 1100 according to the second embodiment. The cameras 202A to 202L deployed around the foreground extraction target field 201, which is a soccer field, and image processing apparatuses 1100A to 1100L connected to the respective cameras are present in the application example 1200. The foreground extraction target field 201 is shot with each camera 202 and a shooting result is inputted to the corresponding image processing apparatus 1100 as the inputted image 105. Each image processing apparatus 1100 generates the foreground area image that represents an extraction result from the inputted image 105.

Next, an operation example of the image processing apparatus 1100 according to the second embodiment will be described with reference to FIGS. 13 to 16B. In the description of this operation example, images shot by the camera 202B and the camera 202D in FIG. 12, which are the same as those in the first embodiment, will be used as the inputted images. Respective inputted images in a state without containing any persons (players, spectators, and the like) or balls become an inputted image 1401 of FIG. 14A and an inputted image 1402 of FIG. 14B. The inputted image 1401 includes a spectator stand A 1403 and a spectator stand B

1404 in addition to the field 403, the goal A 404, and the goal B 405 shown in the first embodiment. The inputted image 1402 includes the spectator stand A 1403 in addition to the field 403, the goal A 404, and the goal B 405 shown in the first embodiment.

Meanwhile, in the second embodiment as well, the first foreground area extraction unit 103 extracts a foreground area by using the method according to the machine learning while the second foreground area extraction unit 104 extracts a foreground area by using the method according to the background differencing technique as with the first embodiment.

Figure 13:
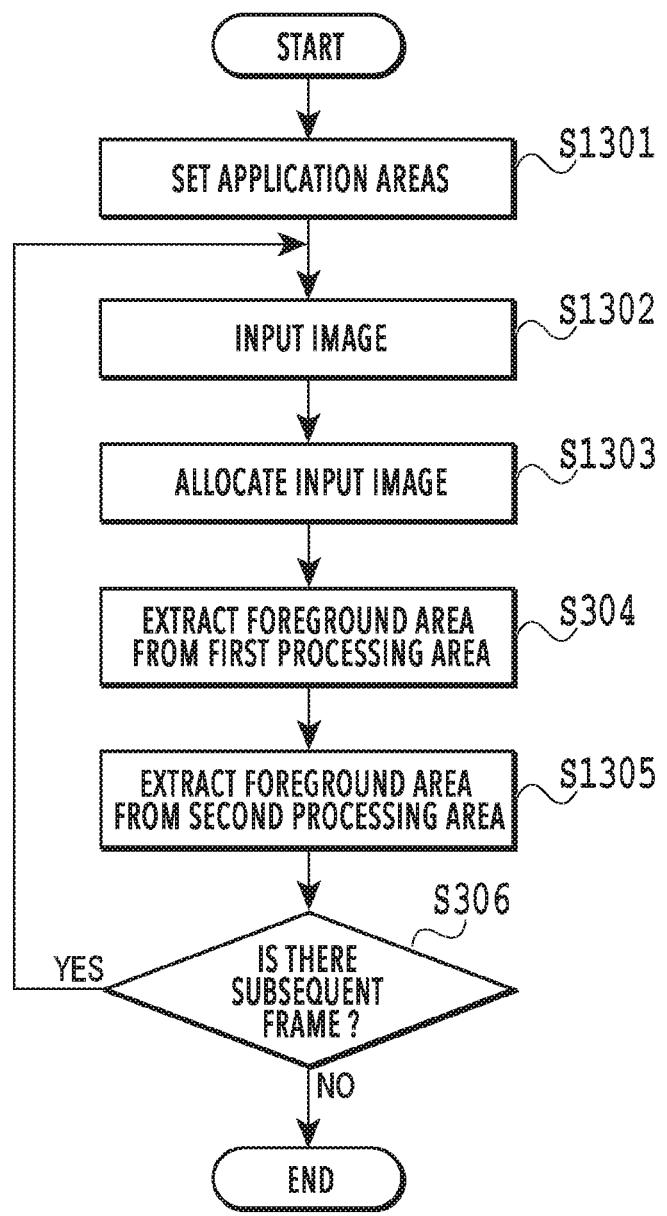
FIG. 13 is a flowchart of foreground extraction processing according to the second embodiment.
Figure 14A:
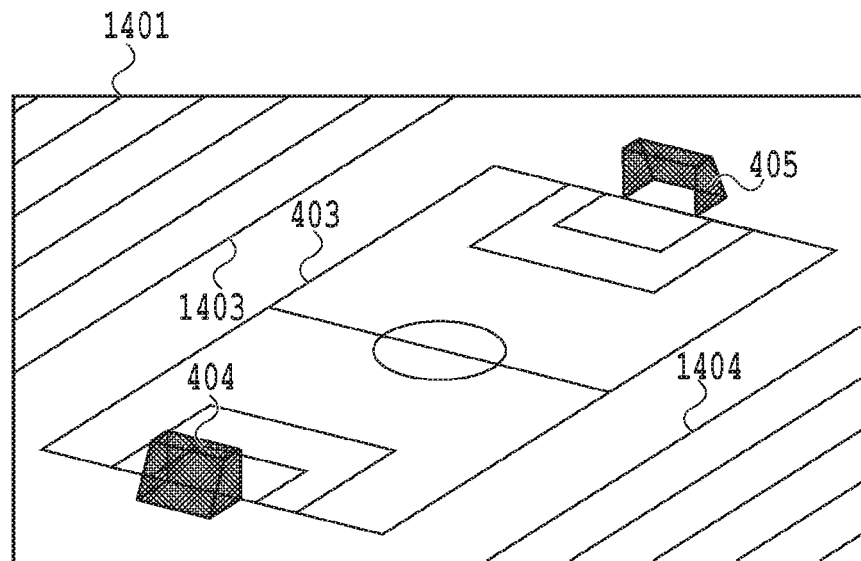
FIG. 14A is a diagram showing an example of an inputted image according to the second embodiment in which only motionless objects are present.
Figure 14B:
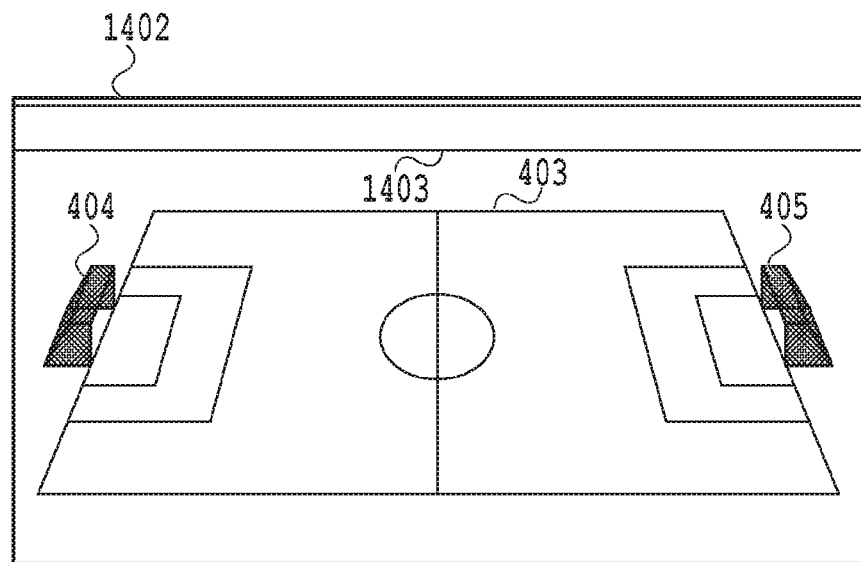
FIG. 14B is a diagram showing another example of an inputted image according to the second embodiment in which only motionless objects are present.
Figure 15A:
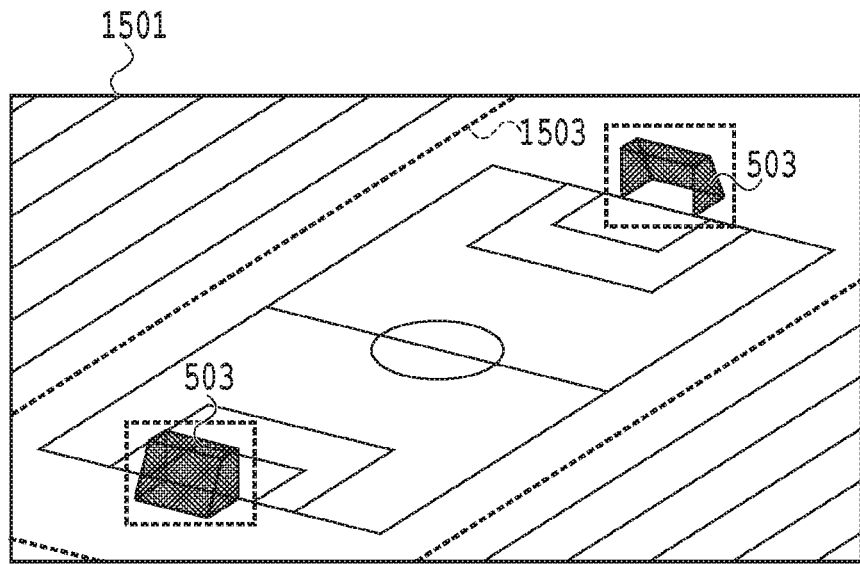
FIG. 15A is a diagram showing an example of area information according to the second embodiment.
Figure 15B:
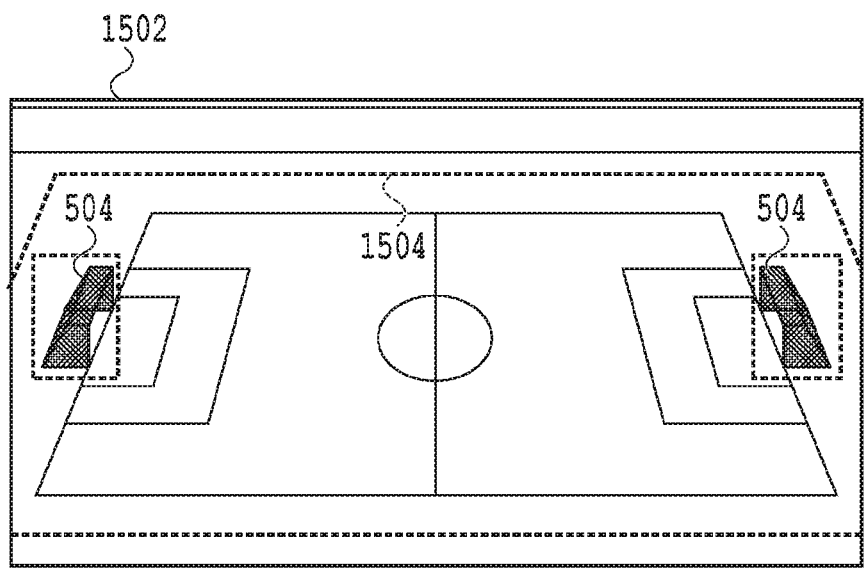
FIG. 15B is a diagram showing another example of area information according to the second embodiment.

FIG. 13 shows a flowchart of the foreground extraction processing according to the second embodiment. In FIG. 13, the steps denoted by the same reference signs as those in FIG. 3 of the first embodiment represent the same operations as in the first embodiment and the explanations thereof will be omitted.

In S1301, the area information setting unit 1102 receives the area information 1103 and performs setting of application areas for the respective foreground area extraction units. An image processing apparatus 1100B corresponding to the camera 202B in this operation example receives area information 1501 shown in FIG. 15A as the area information 1103. Meanwhile, an image processing apparatus 1100D corresponding to the camera 202D in this operation example receives area information 1502 shown in FIG. 15B as the area information 1103. The area information 1501 includes the first processing area 503 and a second processing area 1503 while the area information 1502 includes the first processing area 504 and a second processing area 1504. The first processing areas 503 and 504 are the areas that apply the foreground extraction method based on a result of machine learning (that is, the first foreground area extraction unit 103). The second processing areas 1503 and 1504 are the areas that apply the foreground extraction method according to the background differencing technique (that is, the second foreground area extraction unit 104). The areas not included in the first processing areas 503 and 504 or the second processing areas 1503 and 1504 are not subjected to the foreground extraction processing. In the second embodiment, the spectator stand A 1403 and the spectator stand B 1404 are not included in any foreground extraction processing areas.

The area information 1103 of this embodiment can be expressed by using two pieces of image information. One is first image information indicating whether or not the area is to be subjected to the foreground extraction processing, and the other is second image information indicating which foreground area extraction unit is to be applied to the area to be subjected to the foreground extraction processing. Each of these pieces of image information can be expressed by using binary values of "0" and "1", for example. Here, in the second image information, the area not to be subjected to the foreground extraction processing may be expressed by using an arbitrary value. Here, in the case where the image input unit 1101 performs allocation of the inputted image 105 in a subsequent step, first, the image input unit 1101 refers to the first image information and then determines whether or not the area is to be subjected to the foreground extraction processing. Second, regarding the area to be subjected to the foreground extraction processing, the image input unit 1101 refers to the second image information and then determines which foreground area extraction unit the area is to be allocated to.

Alternatively, the area information 1103 can also be expressed by using multiple values of "0", "1", and "2". For example, the area not subjected to the foreground extraction processing is set to "0", the first processing areas 503 and 504 are set to "1", and the second processing areas 1503 and 1504 are set to "2". By doing so, the image input unit 1101 can allocate the areas set to "1" to the first foreground area extraction unit 103 and allocate the areas set to "2" to the second foreground area extraction unit 104. Here, the areas set to "0" are the areas not to be subjected to the foreground extraction processing and are not allocated to any of the foreground area extraction units.

Figure 16A:
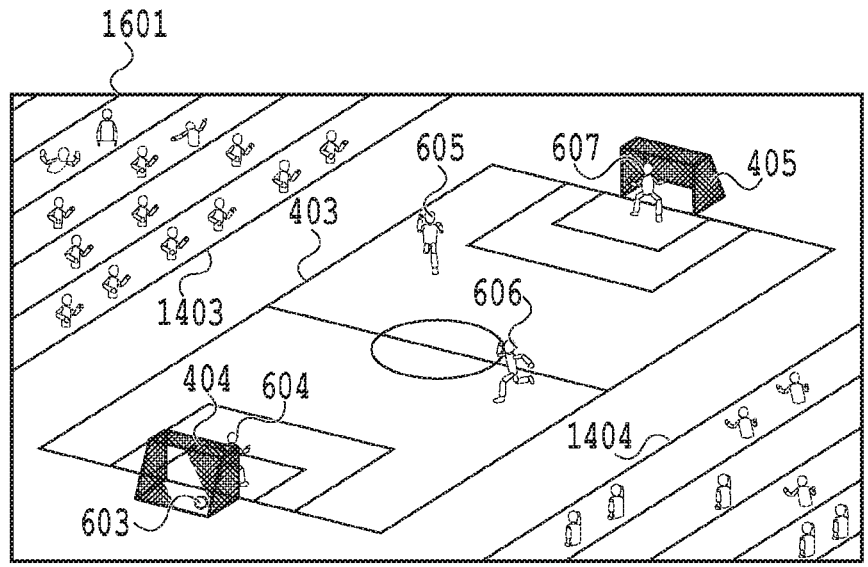
FIG. 16A is a diagram showing an example of an inputted image according to the second embodiment in which moving objects and motionless objects are present.
Figure 16B:
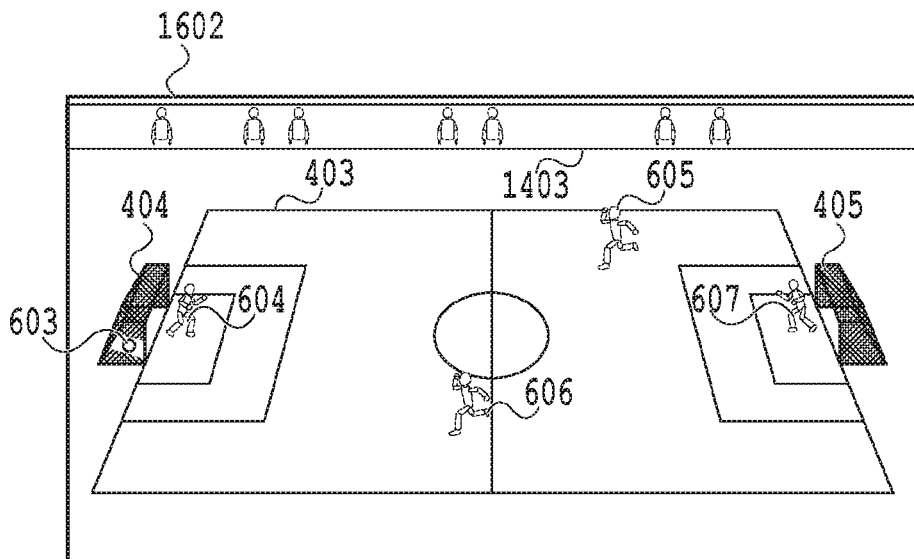
FIG. 16B is a diagram showing another example of an inputted image according to the second embodiment in which moving objects and motionless objects are present.

In S1302, the image input unit 1101 inputs the inputted image 105 which is the target for detection of the foreground area. FIG. 16A shows an inputted image 1601 to the image processing apparatus 1100B in a certain frame where players and a ball are present in the field while spectators are present in the spectator stands. FIG. 16B shows an inputted image 1602 to the image processing apparatus 1100D in the certain frame where the players and the ball are present in the field while the spectators are present in the spectator stands. In addition to the ball 603, the player A 604, the player B 605, the player C 606, and the player D 607, the inputted image 1601 includes the spectator stand A 1403 and the spectator stand B 1404 where spectators are present. In addition to the ball 603, the player A 604, the player B 605, the player C 606, and the player D 607, the inputted image 1602 includes the spectator stand A 1403 where the spectators are present. Here, positions of presence of the players and the ball are set to the same positions as illustrated in FIGS. 6A and 6B of the first embodiment.

In S1303, the image input unit 1101 performs allocation of the inputted image 105 to the first foreground area extraction unit 103 and the second foreground area extraction unit 104 based on the set area information 1103. Of the inputted image 105, images in the first processing areas 503 and 504 are outputted to the first foreground area extraction unit 103 while images in the second processing areas 1503 and 1504 are outputted to the second foreground area extraction unit 104. In the meantime, the areas (such as the spectator stands) not included in any of the first processing areas 503 and 504 as well as the second processing areas 1503 and 1504 are not outputted to any of the foreground area extraction units. For example, in the case where an image of the spectator stand is targeted for foreground extraction according to the background differencing technique, a spectator in the spectator stand who is unnecessary for the foreground may be extracted as the foreground due to a movement of the spectator. However, by excluding the areas corresponding to the spectator stands from the target for foreground extraction, it is possible to eliminate extraction of the unnecessary foreground. Moreover, since the areas to be subjected to the foreground extraction become smaller, the calculation processing load can be reduced as well.

The order of the foreground extraction processing of S304 and S1305 is not limited only to the aforementioned order. Specifically, S1305 may be carried out first or S304 and S1305 may be carried out in parallel.

In S1305, the second foreground area extraction units 104 of the image processing apparatuses 100B and 100D extract the foreground areas from images in the second processing areas 1503 and 1504, respectively. The second foreground area extraction units 104 perform the foreground extraction processing according to the background differencing technique and generate the second foreground area images. In the first embodiment, the processing target by the second foreground area extraction unit 104 is set to the area other than the first processing area. In contrast, the processing target by the second foreground area extraction unit 104 is the area set as the second processing area in this embodiment.

As described above, in this embodiment, the first processing area and the second processing area are set to the inputted image and the area to be excluded from the target for foreground processing is also provided. Accordingly, in the second embodiment, the images to be inputted to the first foreground area extraction unit 103 and the second foreground area extraction unit 104 are the same as those illustrated in FIGS. 7A and 7B as well as FIGS. 8A and 8B as a consequence of excluding the areas of the spectator stands from the inputted images 1601 and 1602. Thus, first and second foreground extraction results representing results of extraction of the foreground areas by the respective foreground area extraction units become identical to those illustrated in FIGS. 9A and 9B as well as FIGS. 10A and 10B.

Here, the areas of the spectator stands may apply different foreground extraction processing. For example, the areas of the spectator stands may apply foreground extraction processing designed to extract an object such as the ball which moves faster than the players and the spectators. A frame subtraction method is an example of the aforementioned foreground extraction processing. This makes it possible to extract an object such as the ball while avoiding extraction of the spectators as the foreground.

As described above, the image processing apparatus 1100 according to the second embodiment can prevent extraction of the unnecessary foreground and reduce the processing load attributed to the foreground extraction processing by setting the area in the inputted image, which is to be excluded from the target for foreground extraction.
(Hardware Configuration)

A hardware configuration of an information processing apparatus 1700 will be described with reference to FIG. 17. A hardware configuration of the image processing apparatus 100 in the above-described embodiment is the same as the configuration of the information processing apparatus 1700 to be explained below. The information processing apparatus 1700 includes a CPU 1711, a ROM 1712, a RAM 1713, an auxiliary storage device 1714, a display unit 1715, an operating unit 1716, a communication I/F 1717, and a bus 1718.

The CPU 1711 realizes the respective functions shown in FIG. 1 by controlling the entire information processing apparatus 1700 by using computer programs and data stored in the ROM 1712 and the RAM 1713. Here, the information processing apparatus 1700 may include one or more sets of dedicated hardware separately from the CPU 1711, and the dedicated hardware may execute at least part of the processing on behalf of the CPU 1711. Examples of the dedicated hardware include an application specific integrated circuit (ASIC), a field programmable gate array (FPGA), a digital signal processor (DSP), and so forth. The ROM 1712 stores programs that do not require changes, and the like. The RAM 1713 temporarily stores programs and data supplied from the auxiliary storage device 1714, data supplied from outside through the communication I/F 1717, and the like. The auxiliary storage device 1714 is formed from a hard disk drive, for example, which stores a variety of data including image data and voice data.

The display unit 1715 is formed from any of a liquid crystal display unit or an LED unit, for example, and displays a graphical user interface (GUI) for allowing a user to operate the information processing apparatus 1700, among other things. The operating unit 1716 is formed from a keyboard, a mouse, a joystick, a touch panel, and the like, and is operated by the user in order to input various instruction to the CPU 1711.

The communication I/F 1717 is used for communication between the information processing apparatus 1700 and an external device. For example, in the case where the information processing apparatus 1700 is connected to the external device by wire, a communication cable is connected to the communication I/F 1717. In the case where the information processing apparatus 1700 has a function to wirelessly communicate with the external device, the communication I/F 1717 is provided with an antenna. The bus 1718 connects the respective components of the information processing apparatus 1700 to one another to transmit information.

Figure 17:
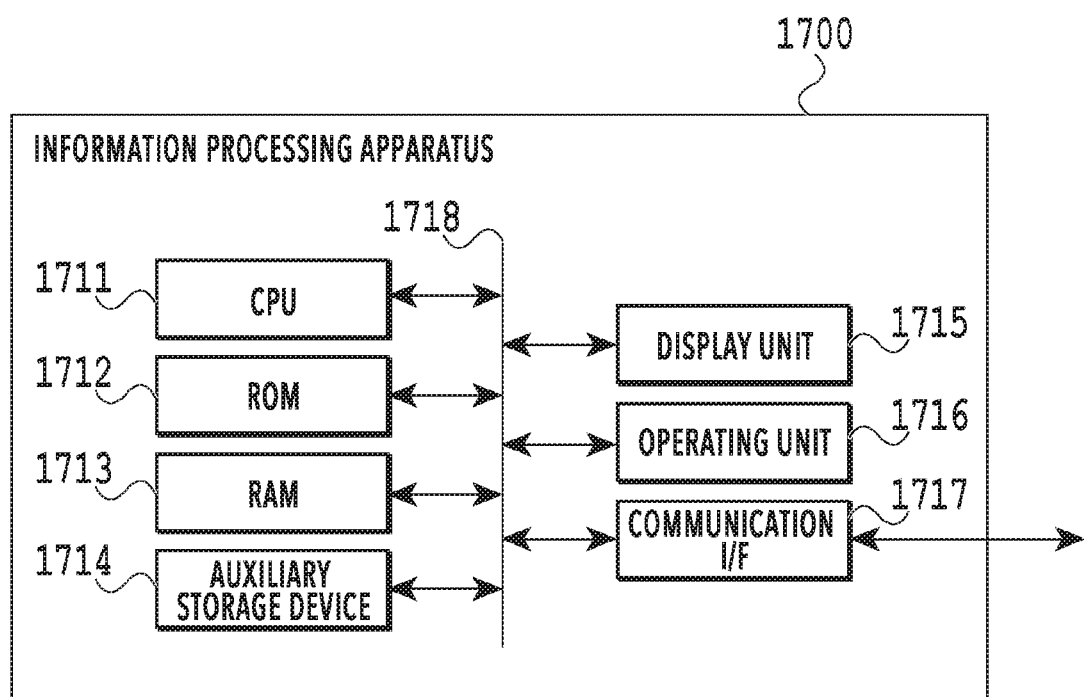
FIG. 17 is a hardware configuration diagram of an information processing apparatus according to the first and second embodiments.

In FIG. 17, the display unit 1715 and the operating unit 1716 are embedded in the information processing apparatus 1700. Instead, at least one of the display unit 1715 and the operating unit 1716 may be provided outside the information processing apparatus 1700 as a separate device. In this case, the CPU 1711 may be operated as a display control device that controls the display unit 1715 or as an operation control unit that controls the operating unit 1716.

Other Embodiments

The first and second embodiments have described the case of using the two foreground area extraction units. However, the present disclosure is not limited only to this configuration. It is also possible to use three or more foreground area extraction units.

Alternatively, it is also possible to use one foreground area extraction unit and to set a foreground extraction unit application area corresponding thereto. This configuration is equivalent to setting an area targeted for the foreground extraction processing and an area not targeted for the foreground extraction processing in an inputted image.

The first and second embodiments have described the case of using the foreground area extraction method based on a result of machine learning as the first foreground area extraction unit. However, the present disclosure is not limited only to this configuration. For example, it is also possible to apply a method of extracting a feature quantity of a motionless object in advance and extracting the motionless object as a foreground area by comparing a feature quantity included in an inputted image with the former feature quantity.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to extract a foreground area more appropriately.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-182004, filed Oct. 2, 2019, which is hereby incorporated by reference wherein in its entirety.

What is claimed is:

1. An image processing apparatus comprising:
a processor; and
a memory, including instructions stored thereon, which when executed by the processor cause the image processing apparatus to:
set, based on area information, a partial area in an input image as either a first area or a second area different from the first area;
extract a first foreground area from the first area; and
extract a second foreground area, different from the first foreground area, from the second area by using an extraction method different from an extraction method,
wherein the area information is information that specifies the location of the first area to which extraction processing is applied and the location of the second area to which extraction processing is applied, with respect to the input image.

2. The image processing apparatus according to claim 1, wherein the area information is information designated in advance by a user.

3. The image processing apparatus according to claim 1, wherein the instructions, when executed by the processor, further cause the image processing apparatus to:
set, based on the area information, a partial area in the input image as a third area different from the first area and the second area, and
processing to extract a foreground area is not performed on the third area.

4. The image processing apparatus according to claim 1, wherein the first foreground area is extracted by using an extraction method based on a result of machine learning.

5. The image processing apparatus according to claim 1, wherein the first foreground area is extracted by using an extraction method based on a feature quantity.

6. The image processing apparatus according to claim 1, wherein the second foreground area is extracted by using an extraction method based on a background difference.

7. The image processing apparatus according to claim 1, wherein
the first foreground area is extracted by using an extraction method capable of extracting a motionless object as the first foreground area, and
the second foreground area is extracted by using an extraction method capable of extracting a moving object as the second foreground area.

8. The image processing apparatus according to claim 7, wherein the motionless object and the moving object is extracted as the first foreground area from the first area.

9. The image processing apparatus according to claim 7, wherein the moving object includes at least one of a person and a ball.

10. The image processing apparatus according to claim 7, wherein the motionless object is an object installed at a predetermined position.

11. The image processing apparatus according to claim 7, wherein at least part of the motionless object is installed on a field where a person being the moving object plays a game.

12. The image processing apparatus according to claim 7, wherein the motionless object includes at least one of a soccer goal and a corner flag used in a soccer match.

13. An image processing method comprising:
setting, based on area information, a partial area in an input image as either a first area or a second area different from the first area;
extracting a first foreground area from the first area; and
extracting a second foreground area, different from the first foreground area, from the second area by using a method different from a method of extracting the foreground area from the first area,
wherein the area information is information that specifies the location of the first area to which extraction processing is applied and the location of the second area to which extraction processing is applied, with respect to the input image.

14. A non-transitory computer-readable storage medium storing a program for causing a computer to perform a method comprising:
setting, based on area information, a partial area in an input image as either a first area or a second area different from the first area;
extracting a first foreground area from the first area; and
extracting a second foreground area from the second area, different from the first foreground area, by using a method different from a method of extracting the foreground area from the first area,
wherein the area information is information that specifies the location of the first area to which extraction processing is applied and the location of the second area to which extraction processing is applied, with respect to the input image.

* * * * *